United States Patent
Chen et al.

(10) Patent No.: US 11,106,013 B2
(45) Date of Patent: Aug. 31, 2021

(54) IMAGING OPTICAL LENS

(71) Applicant: AAC Acoustic Technologies (Shenzhen) Co., Ltd., Shenzhen (CN)

(72) Inventors: Chenxiyang Chen, Shenzhen (CN); Chunhuan Fang, Shenzhen (CN); Hiroyuki Teraoka, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 79 days.

(21) Appl. No.: 16/524,075

(22) Filed: Jul. 28, 2019

(65) Prior Publication Data

US 2020/0041765 A1 Feb. 6, 2020

(30) Foreign Application Priority Data

Aug. 2, 2018 (CN) .......................... 201810871510.4

(51) Int. Cl.
*G02B 9/62* (2006.01)
*G02B 13/00* (2006.01)
*G02B 27/00* (2006.01)
*G02B 13/18* (2006.01)

(52) U.S. Cl.
CPC ........... *G02B 13/0045* (2013.01); *G02B 9/62* (2013.01); *G02B 13/18* (2013.01); *G02B 27/0025* (2013.01)

(58) Field of Classification Search
CPC ...... G02B 13/0045; G02B 9/62; G02B 13/18; G02B 27/0025; G02B 13/06
See application file for complete search history.

(56) References Cited

U.S. PATENT DOCUMENTS

| | | | | |
|---|---|---|---|---|
| 2009/0185294 A1* | 7/2009 | Teraoka | ............... | G02B 13/003 359/794 |
| 2009/0284846 A1* | 11/2009 | Teraoka | ................... | G02B 9/16 359/785 |
| 2013/0070346 A1* | 3/2013 | Hsu | .......................... | G02B 9/62 359/713 |
| 2014/0376105 A1* | 12/2014 | Sekine | ..................... | G02B 9/64 359/708 |
| 2016/0124191 A1* | 5/2016 | Hashimoto | ........ | G02B 13/0045 359/708 |
| 2016/0306145 A1* | 10/2016 | Tang | .................. | G02B 13/0045 |

* cited by examiner

*Primary Examiner* — Balram T Parbadia
*Assistant Examiner* — Gabriel A Sanz
(74) *Attorney, Agent, or Firm* — W&G Law Group LLP

(57) ABSTRACT

The present disclosure relates to optical lenses and discloses an imaging optical lens The imaging optical lens includes from an object side to an image side in sequence: a first lens having a positive refractive power, a second lens having a negative refractive power, a third lens having a positive refractive power, a fourth lens having a negative refractive power, a fifth lens having a positive refractive power, and a sixth lens having a negative refractive power. A focal length of the first lens is f1, a focal length of the second lens is f2, a curvature radius of an object-side surface of the third lens is R5, a curvature radius of an image-side surface of the third lens is R6, and the following relational expressions are satisfied: $20 \leq (R5+R6)/(R5-R6) \leq 100$; and $-10 \leq f2/f1 \leq -2.7$.

3 Claims, 6 Drawing Sheets

IMAGING OPTICAL LENS

TECHNICAL FIELD

The present disclosure relates to optical lenses, and in particular, to an imaging optical lens applied to portable terminal devices such as smart phones and digital cameras and imaging devices such as monitors and PC lenses.

BACKGROUND

In recent years, with a continuous improvement of processes for manufacturing photosensitive elements such as charge coupled devices (CCD) and complementary metal-oxide semiconductors (CMOS), a pixel size of photosensitive elements is decreasing gradually, and performance of photosensitive elements is continuously improved. Therefore, there is a need for an optical imaging system with excellent optical performance and high light flux.

At present, a technical solution of a six-piece lens with a large aperture and high light flux is being promoted. For example, an imaging optical lens includes from an object side to an image side in sequence: a first lens having a positive refractive power, a second lens having a negative refractive power, a third lens having a negative refractive power, a fourth lens having a positive refractive power, a fifth lens having a positive or a negative refractive power, and a sixth lens having a negative refractive power. However, as a ratio of the refractive power of the lenses of the imaging optical lens is not properly distributed, the light flux is insufficient. Further, as shapes of the lenses are not set properly, a wide angle effect cannot be achieved.

The imaging optical lens in existing technologies cannot provide excellent imaging quality while achieving a large aperture, high light flux, and a wide angle. Therefore, it is necessary to provide a new technical solution to overcome the foregoing limitations.

DETAILED DESCRIPTION

To make objectives, technical solutions, and advantages of the present disclosure clearer, the following further describes embodiments of the present disclosure in detail with reference to accompanying drawings. However, those of ordinary skill in the art may understand that in the embodiments of the present disclosure, many technique details are described to make readers better understand the present disclosure. However, the technical solutions as claimed in the present disclosure may also be realized even without these technique details or various variations and modifications based on the following embodiments.

Embodiment 1

Figure 1:
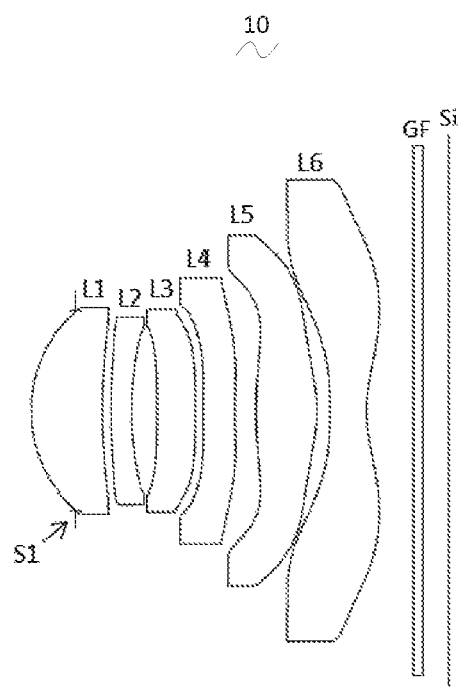
FIG. 1 is a schematic structural diagram of an imaging optical lens according to a first embodiment of the present disclosure.

Referring to the accompanying drawings, the present disclosure provides an imaging optical lens 10. FIG. 1 shows an imaging optical lens 10 according to the first embodiment of the present disclosure. The imaging optical lens 10 includes six lenses. Specifically, the imaging optical lens 10 includes from an object side to an image side in sequence: an aperture S1, a first lens L1, a second lens L2, a third lens L3, a fourth lens L4, a fifth lens L5, and a sixth lens L6. In this embodiment, optical elements such as a glass plate GF may be disposed between the sixth lens L6 and an image surface Si. The glass plate GF may be a glass cover plate, or a filter having functions such as IR cut-off filtering. Of course, in other embodiments, the glass plate GF may also be disposed at other positions.

In this embodiment, the first lens has a positive refractive power, and has an object-side surface which is a convex surface projecting outwardly, and an image-side surface which is a concave surface. The second lens L2 has a negative refractive power, and has an object-side surface which is a convex surface, and an image-side surface which is a concave surface. The third lens L3 has a positive refractive power, and has an object-side surface which is a concave surface, and an image-side surface which is a convex surface. The fourth lens L4 has a negative refractive power, and has an object-side surface which is a convex surface, and an image-side surface which is a concave surface. The fifth lens L5 has a positive refractive power. In this embodiment, both an object-side surface and an image-side surface of the fifth lens L5 are convex surfaces. The sixth lens L6 has a negative refractive power. In this embodiment, both an object-side surface and an image-side surface of the sixth lens L6 are concave surfaces.

To better correct aberrations, preferably, surfaces of the six lenses are designed in aspheric shapes.

It is defined herein that a focal length of the first lens L1 is f1, a focal length of the second lens L2 is f2, a curvature radius of the object-side surface of the third lens L3 is R5, and the curvature radius of the image-side surface of the third lens L3 is R6. f1, f2, R5 and R6 satisfy the following relational expressions:

$$20 \le (R5+R6)/(R5-R6) \le 100 \quad (1)$$

$$-10 \le f2/f1 \le -2.7 \quad (2)$$

A shape of the third lens is specified by the relational expression (1). It should be noted that as lenses are developing toward a wide angle and ultra-thinness, optical parameters within a range of the relational expression (1) can help correct higher-order aberrations of the lens system.

A ratio between the focal length of the first lens L1 and that of the second lens L2 is specified in the relational expression (2). In this way, a more reasonable distribution of a focal power of the imaging optical lens 10 can be achieved, thereby improving optical performance of the imaging optical lens 10, and reducing sensitivity of the system.

With lens configuration above, this embodiment adopts the lenses (L1, L2, L3, L4, L5, and L6) having different refractive power, the first lens L1 and the second lens L2 of which the focal lengths have a specific matching relationship, and the third lens L3 of which the curvature radii of the object-side surface and the image-side surface have a specific relationship. Thus, the focal power of the first lens L1 and the second lens L2 of the imaging optical lens 10 is reasonably distributed, and shapes of the object-side surface and the image-side surface of the third lens L3 are reasonably designed, so that the imaging optical lens 10 provides excellent imaging quality while achieving a large aperture, high light flux, and a wide angle.

Specifically, in this embodiment of the present disclosure, the first lens L1 has a positive refractive power, a thickness on-axis of the first lens L1 is d1, a focal length of the entire imaging optical lens is f, and d1 and f may be designed to satisfy the following relational expression:

$$0.20 \le d1/f \le 0.50 \quad (3)$$

A ratio between the thickness on-axis d1 of the first lens L1 and a focal length f of the entire imaging optical lens is specified in relational expression (3). Such a design facilitates a development of the imaging optical lens 10 toward a wide angle.

Further, in this embodiment of the present disclosure, the third lens L3 has a positive refractive power, a thickness on-axis of the third lens L3 is d5, a focal length of the entire imaging optical lens 10 is f, and d5 and f may be designed to satisfy the following relational expression:

$$0.11 \le d5/f \le 0.2 \quad (4)$$

A ratio between the thickness on-axis d5 of the third lens L3 and the focal length f of the entire imaging optical lens is specified in relational expression (4). Such a configuration facilitates the development of the imaging optical lens 10 toward a wide angle.

In addition, in this embodiment, a curvature radius of the object-side surface of the first lens L1 is R1, and a curvature radius of the image-side surface of the first lens L1 is R2, and R1 and R2 may be designed to satisfy the following relational expression:

$$-1.90 \le (R1+R2)/(R1-R2) \le -1.7 \quad (5)$$

The shape of the first lens L1 is specified in the relational expression (5). As lenses are developing toward a wide angle and a large aperture, R1 and R5 within a range of the relational expression (5) can help correct higher-order aberrations such as spherical aberrations of the imaging optical lens 10.

It should be noted that as the first lens L1, the second lens L2, the third lens L3, the fourth lens L4, the fifth lens L5, and the sixth lens L6 that constitute the imaging optical lens 10 in this embodiment have the above structure and parameter relationship, the imaging optical lens 10 can reasonably distribute the focal power, the surface shape, the material, the thickness on-axis and the like of each lens, and thus correct aberrations. Therefore, for an optical imaging system represented by the imaging optical lens 10 of the present disclosure, Fno≤1.75, thereby providing excellent imaging quality while achieving a large aperture, high light flux, and a wide angle.

FIG. 1 is a schematic structural diagram of the imaging optical lens 10 in the first embodiment. Design data of the imaging optical lens 10 in the first embodiment of the present disclosure is shown below.

Table 1 illustrates the curvature radii r of the object-side surface and the image-side surface of the first lens L1 to the sixth lens L6 that constitute the imaging optical lens 10 in this embodiment (the first embodiment), the thickness on-axis d of each lens or a distance on-axis d between lenses, and a refractive index nd and an Abbe number vd of each lens. It should be noted that, in this embodiment, the curvature radius and the thickness on-axis are measured in millimeters (mm).

TABLE 1

|  | r |  | d | nd |  | vd |  |
|---|---|---|---|---|---|---|---|
| S1 | ∞ | d0 = | −0.495 |  |  |  |  |
| R1 | 1.505 | d1 = | 0.793 | nd1 | 1.5300 | v1 | 74.87 |
| R2 | 5.421 | d2 = | 0.094 |  |  |  |  |
| R3 | 4.858 | d3 = | 0.232 | nd2 | 1.6614 | v2 | 20.41 |
| R4 | 3.187 | d4 = | 0.281 |  |  |  |  |
| R5 | −294.924 | d5 = | 0.430 | nd3 | 1.5445 | v3 | 55.99 |
| R6 | −272.237 | d6 = | 0.087 |  |  |  |  |
| R7 | 14.013 | d7 = | 0.353 | nd4 | 1.6150 | v4 | 25.92 |
| R8 | 6.876 | d8 = | 0.235 |  |  |  |  |
| R9 | 5.118 | d9 = | 0.677 | nd5 | 1.5445 | v5 | 55.99 |
| R10 | −1.620 | d10 = | 0.146 |  |  |  |  |
| R11 | −5.258 | d11 = | 0.402 | nd6 | 1.5352 | v6 | 56.09 |
| R12 | 1.319 | d12 = | 0.527 |  |  |  |  |
| R13 | ∞ | d13 = | 0.110 | ndg | 1.5168 | vg | 64.17 |
| R14 | ∞ | d14 = | 0.284 |  |  |  |  |

Meanings of the symbols in the above table are as follows.
r: the curvature radius of an optical surface;
S1: the aperture;
R1: the object-side surface of the first lens L1;
R2: the image-side surface of the first lens L1;
R3: the object-side surface of the second lens L2;
R4: the image-side surface of the second lens L2;
R5: the object-side surface of the third lens L3;
R6: the image-side surface of the third lens L3;
R7: the object-side surface of the fourth lens L4;
R8: the image-side surface of the fourth lens L4;
R9: the object-side surface of the fifth lens L5;
R10: the image-side surface of the fifth lens L5;
R11: the object-side surface of the sixth lens L6;
R12: the image-side surface of the sixth lens L6;
R13: the object-side surface of the glass plate GF;
R14: the image-side surface of the glass plate GF;
d: the thickness on-axis of the lenses or the distance on-axis between neighboring lenses;
d0: the distance on-axis from the aperture S1 to the object-side surface of the first lens L1;
d1: the thickness on-axis of the first lens L1;
d2: the distance on-axis from the image-side surface of the first lens L1 to the object-side surface of the second lens L2;
d3: the thickness on-axis of the second lens L2;
d4: the distance on-axis from the image-side surface of the second lens L2 to the object-side surface of the third lens L3;
d5: the thickness on-axis of the third lens L3;
d6: the distance on-axis from the image-side surface of the third lens L3 to the object-side surface of the fourth lens L4;
d7: the thickness on-axis of the fourth lens L4;
d8: the distance on-axis from the image-side surface of the fourth lens L4 to the object-side surface of the fifth lens L5;
d9: the thickness on-axis of the fifth lens L5;
d10: the distance on-axis from the image-side surface of the fifth lens L5 to the object-side surface of the sixth lens L6;
d11: the thickness on-axis of the sixth lens L6;
d12: the distance on-axis from the image-side surface of the sixth lens L6 to the object-side surface of the optical filter GF;
d13: the thickness on-axis of the glass plate GF;
d14: the distance on-axis from the image-side surface of the glass plate GF to the image surface Si;
nd: the refractive index of the d line;
nd1: the refractive index of the first lens L1;
nd2: the refractive index of the second lens L2;
nd3: the refractive index of the third lens L3;
nd4: the refractive index of the fourth lens L4;
nd5: the refractive index of the fifth lens L5;
nd6: the refractive index of the sixth lens L6;
ndg: the refractive index of the glass plate GF;
vd: the Abbe number;
v1: the Abbe number of the first lens L1;
v2: the Abbe number of the second lens L2;
v3: the Abbe number of the third lens L3;
v4: the Abbe number of the fourth lens L4;
v5: the Abbe number of the fifth lens L5;
v6: the Abbe number of the sixth lens L6; and
vg: the Abbe number of the glass plate GF.

Table 2 illustrates aspheric data of lenses of the imaging optical lens 10 in the first embodiment of the present disclosure.

TABLE 2

| | Conic coefficient | Aspheric coefficient | | | | | | |
|---|---|---|---|---|---|---|---|---|
| | k | A4 | A6 | A8 | A10 | A12 | A14 | A16 |
| R1 | −0.2603 | −1.5823E−03 | 9.1045E−02 | −2.6429E−01 | 4.6267E−01 | −4.4896E−01 | 2.3051E−01 | −4.8563E−02 |
| R2 | 17.7442 | −4.5632E−02 | −9.7414E−02 | 3.8735E−01 | −6.7211E−01 | 6.2629E−01 | −3.0279E−01 | 5.5646E−02 |
| R3 | 10.1909 | −1.3416E−01 | 6.6992E−02 | 1.0265E−01 | −2.4258E−01 | 2.7285E−01 | −1.6126E−01 | 3.7490E−02 |
| R4 | 9.0452 | −1.3008E−01 | 1.4967E−01 | −4.3924E−01 | 1.1866E+00 | −1.8429E+00 | 1.4777E+00 | −4.8489E−01 |
| R5 | 499.7631 | −1.0650E−01 | 1.2813E−01 | −7.5782E−01 | 1.6672E+00 | −2.0450E+00 | 1.3047E+00 | −3.2658E−01 |
| R6 | 499.9886 | −1.6498E−01 | −1.0441E−01 | 9.5002E−01 | −2.7855E+00 | 3.8269E+00 | −2.5369E+00 | 6.5881E−01 |
| R7 | −198.0002 | −2.3430E−01 | −1.8075E−03 | 7.2829E−01 | −1.7738E+00 | 2.0133E+00 | −1.1093E+00 | 2.3230E−01 |
| R8 | 10.0976 | −2.4798E−01 | 1.6629E−01 | −8.1908E−02 | 2.7925E−02 | 1.1594E−02 | −1.3845E−02 | 3.1103E−03 |
| R9 | −22.6983 | 1.2054E−02 | −8.0792E−02 | 5.2095E−02 | −3.4049E−02 | 1.1220E−02 | −1.8162E−03 | 2.3890E−04 |
| R10 | −10.1364 | 1.0265E−01 | −4.4020E−02 | −6.5761E−03 | 6.3655E−03 | −1.3926E−03 | 1.1962E−04 | −2.4762E−06 |
| R11 | −1.6976 | −1.4917E−01 | 8.7889E−02 | −2.5964E−02 | 6.4946E−03 | −1.3922E−03 | 1.8707E−04 | −1.0750E−05 |
| R12 | −10.0217 | −1.2058E−01 | 6.7330E−02 | −2.8106E−02 | 7.3096E−03 | −1.1408E−03 | 1.0151E−04 | −4.0217E−06 |

In table 2, K is a conic coefficient, and A4, A6, A8, A10, A12, A14, and A16 are aspheric coefficients.

It should be noted that, preferably, aspheric surfaces shown in the following relational expression (6) are used as aspheric surfaces of the lenses in this embodiment. However, the aspheric surface shown in the following relational expression (6) is only an example, and in practice, the present disclosure is not limited to the aspheric surface shown in the relational expression (6).

$$Y=(x^2/R)/\{1+[1-(1+k)(x^2/R^2)]^{1/2}\}+A_4x^4+A_6x^6+A_8x^8+A_{10}x^{10}+A_{12}x^{12}+A_{14}x^{14}+A_{16}x^{16} \quad (6)$$

Figure 2:
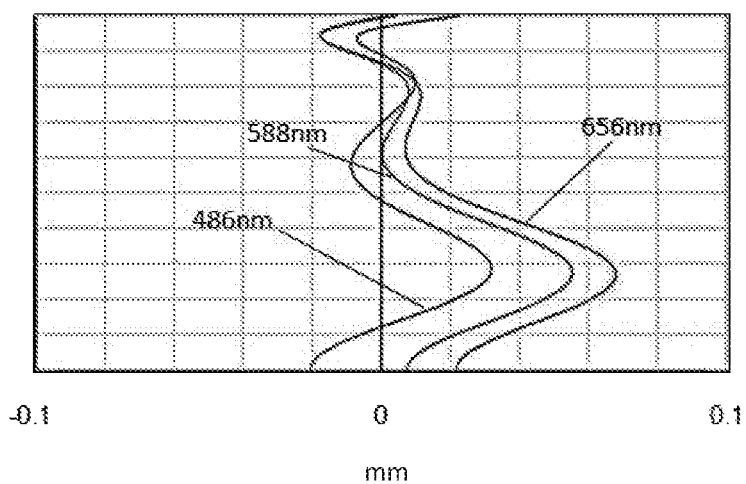
FIG. 2 is a schematic diagram of a longitudinal aberration of the imaging optical lens shown in FIG. 1.
Figure 3:
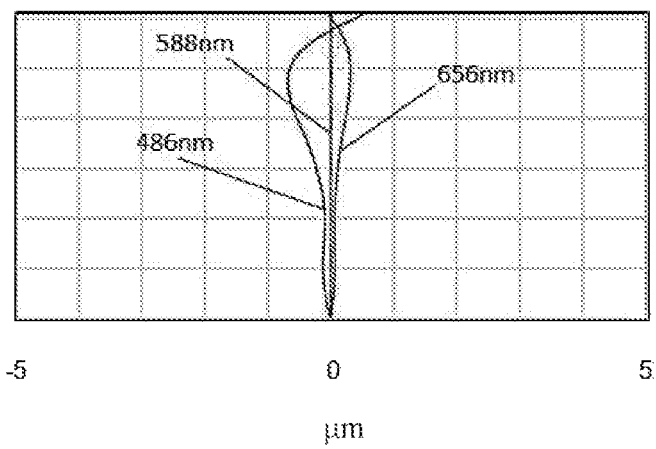
FIG. 3 is a schematic diagram of a lateral color of the imaging optical lens shown in FIG. 1.
Figure 4:
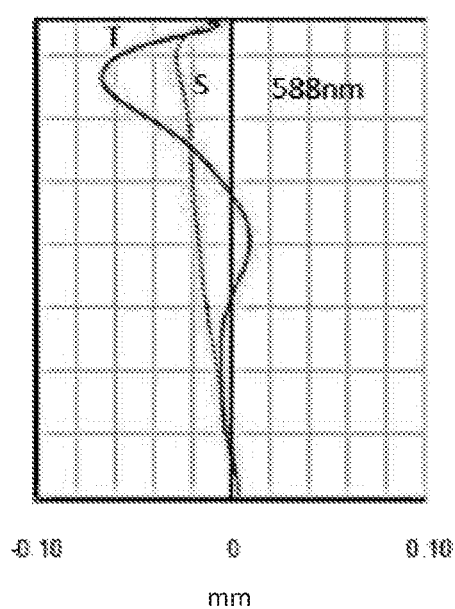
FIG. 4 is a schematic diagram of a field curvature and a distortion of the imaging optical lens shown in FIG. 1.
Figure 4:
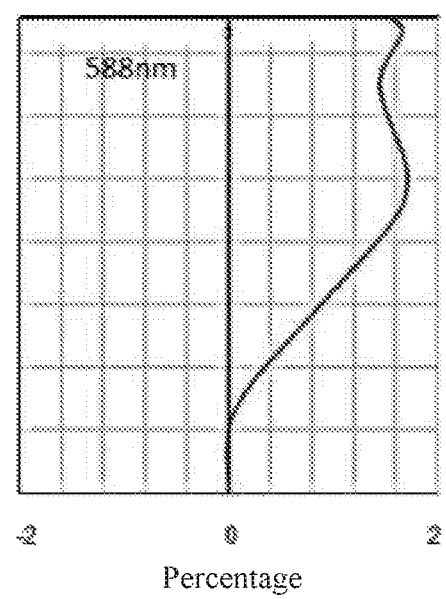

In addition, Table 7 below further shows values of f, f1, f2, f3, f4, f5, and f6 in the first embodiment, and f1 and f2, d1 and f, d5 and f, R1 and R2, and R5 and R6 respectively satisfy relational expressions listed in Table 7. FIG. 2 and FIG. 3 are respectively schematic diagrams of a longitudinal aberration and a lateral color obtained when light having wavelengths of 486 nm, 588 nm and 656 nm passes through the imaging optical lens 10 in the first embodiment. FIG. 4 is a schematic diagram of a field curvature and a distortion obtained when light having a wavelength of 588 nm passes through the imaging optical lens 10 in the first embodiment. In FIG. 4, S is a field curvature in a sagittal direction, and T is a field curvature in a meridian direction.

In this embodiment, a full angle of view of the imaging optical lens 10 is 2ω and an F value is Fno, where 2ω=73.06° and Fno=1.732. In this way, the imaging optical lens 10 has a wide angle, high light flux, and excellent optical properties.

Embodiment 2

Figure 5:
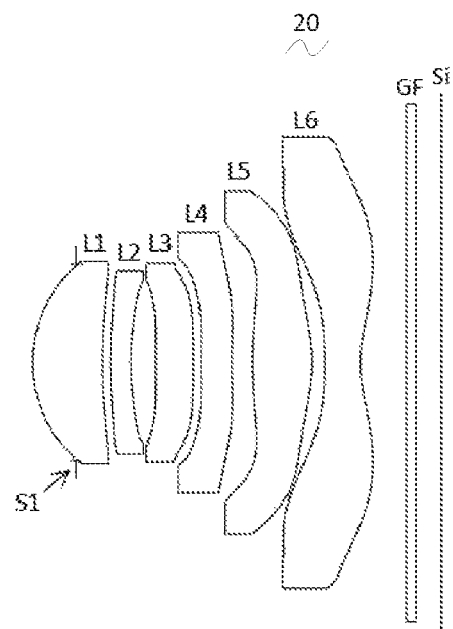
FIG. 5 is a schematic structural diagram of an imaging optical lens according to a second embodiment of the present disclosure.

FIG. 5 is a schematic structural diagram of an imaging optical lens 20 in the second embodiment. The second embodment is substantially the same as the first embodiment, and symbols in the second embodiment have the same meanings as those in the first embodiment. Only differences between the second embodiment and the first embodiment are listed below.

Table 3 illustrates curvature radii r of the object-side surface and the image-side surface of the first lens L1 to the sixth lens L6 that constitute the imaging optical lens 20 in the second embodiment, a thickness on-axis d of each lens or a distance on-axis d between lenses, and a refractive index nd and an Abbe number vd of each lens. Table 4 illustrates aspheric data of the lenses of the imaging optical lens 20 in the second embodiment.

It should be noted that, in this embodiment, the curvature radius and the thickness on-axis are measured in millimeters.

TABLE 3

| | r | d | | nd | | vd | |
|---|---|---|---|---|---|---|---|
| S1 | ∞ | d0 = | −0.512 | | | | |
| R1 | 1.465 | d1 = | 0.795 | nd1 | 1.5004 | v1 | 95.87 |
| R2 | 4.791 | d2 = | 0.097 | | | | |
| R3 | 3.865 | d3 = | 0.231 | nd2 | 1.6614 | v2 | 20.41 |
| R4 | 3.263 | d4 = | 0.323 | | | | |
| R5 | −26.337 | d5 = | 0.431 | nd3 | 1.5445 | v3 | 55.99 |
| R6 | −25.814 | d6 = | 0.087 | | | | |
| R7 | 70.407 | d7 = | 0.272 | nd4 | 1.6150 | v4 | 25.92 |
| R8 | 8.597 | d8 = | 0.202 | | | | |
| R9 | 5.780 | d9 = | 0.734 | nd5 | 1.5445 | v5 | 55.99 |
| R10 | −1.465 | d10 = | 0.123 | | | | |
| R11 | −4.740 | d11 = | 0.411 | nd6 | 1.5352 | v6 | 56.09 |
| R12 | 1.239 | d12 = | 0.531 | | | | |
| R13 | ∞ | d13 = | 0.110 | ndg | 1.5168 | vg | 64.17 |
| R14 | ∞ | d14 = | 0.284 | | | | |

TABLE 4

| | Conic coefficient | Aspheric coefficient | | | | | | |
|---|---|---|---|---|---|---|---|---|
| | k | A4 | A6 | A8 | A10 | A12 | A14 | A16 |
| R1 | −0.2797 | −1.9214E−03 | 9.0433E−02 | −2.6415E−01 | 4.6310E−01 | −4.4878E−01 | 2.3043E−01 | −4.8851E−02 |
| R2 | 15.8199 | −5.0418E−02 | −9.5781E−02 | 3.8476E−01 | −6.7380E−01 | 6.2354E−01 | −3.0204E−01 | 5.5272E−02 |
| R3 | 9.2519 | −1.3352E−01 | 5.6550E−02 | 9.8660E−02 | −2.4333E−01 | 2.7150E−01 | −1.6056E−01 | 4.0177E−02 |
| R4 | 9.7537 | −1.2462E−01 | 1.4257E−01 | −4 3944E−01 | 1.1842E+00 | −1.8473E+00 | 1.4764E+00 | −4.7849E−01 |
| R5 | 473.9770 | −1.2735E−01 | 1.4283E−01 | −7.5930E−01 | 1.6622E+00 | −2.0572E+00 | 1.2907E+00 | −3.0452E−01 |
| R6 | 500.0790 | −1.7113E−01 | −1.1204E−01 | 9.5606E−01 | −2.7856E+00 | 3.8206E+00 | −2.5366E+00 | 6.6376E−01 |
| R7 | 500.0780 | −2.3369E−01 | −1.9905E−03 | 7.2632E−01 | −1.7749E+00 | 2.0111E+00 | −1.1084E+00 | 2.3351E−01 |
| R8 | 19.5525 | −2.3435E−01 | 1.6655E−01 | −8.4905E−02 | 2.7897E−02 | 1.1769E−02 | −1.3835E−02 | 3.1367E−03 |
| R9 | −20.0504 | 1.0578E−02 | −8.2600E−02 | 5.0079E−02 | −3.3892E−02 | 1.1379E−02 | −1.7019E−03 | 2.4335E−04 |

TABLE 4-continued

| | Conic coefficient | Aspheric coefficient | | | | | | |
|---|---|---|---|---|---|---|---|---|
| | k | A4 | A6 | A8 | A10 | A12 | A14 | A16 |
| R10 | −8.6696 | 1.0061E−01 | −4.4296E−02 | −6.4920E−03 | 6.4177E−03 | −1.4023E−03 | 1.2073E−04 | −2.7296E−06 |
| R11 | −2.0339 | −1.4854E−01 | 8.7974E−02 | −2.5905E−02 | 6.4932E−03 | −1.3959E−03 | 1.8651E−04 | −1.0586E−05 |
| R12 | −9.9187 | −1.1985E−01 | 6.7687E−02 | −2.8157E−02 | 7.2980E−03 | −1.1412E−03 | 1.0162E−04 | −3.9996E−06 |

Table 7 below exemplarily shows values of f, f1, f2, f3, f4, f5, and f6 in the second embodiment, and f1 and f2, d1 and f, d5 and f, R1 and R2, and R5 and R6 respectively satisfy the relational expressions listed in Table 7.

Figure 6:
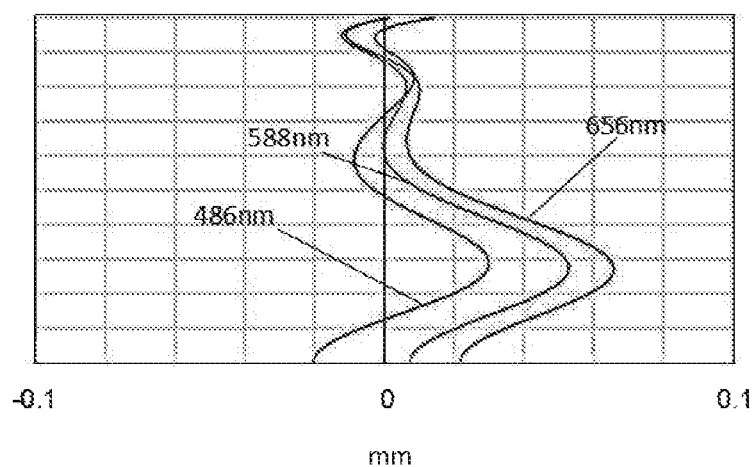
FIG. 6 is a schematic diagram of a longitudinal aberration of the imaging optical lens shown in FIG. 5.
Figure 7:
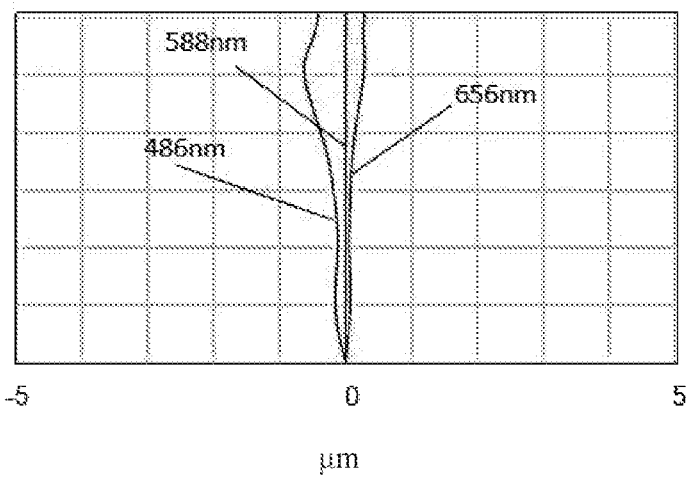
FIG. 7 is a schematic diagram of a lateral color of the imaging optical lens shown in FIG. 5.
Figure 8:
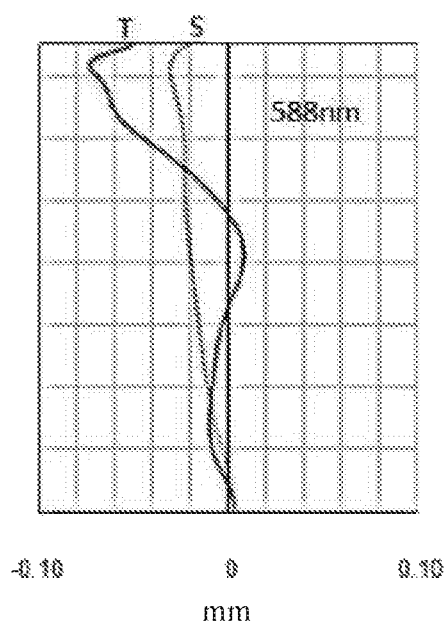
FIG. 8 is a schematic diagram of a field curvature and a distortion of the imaging optical lens shown in FIG. 5.
Figure 8:
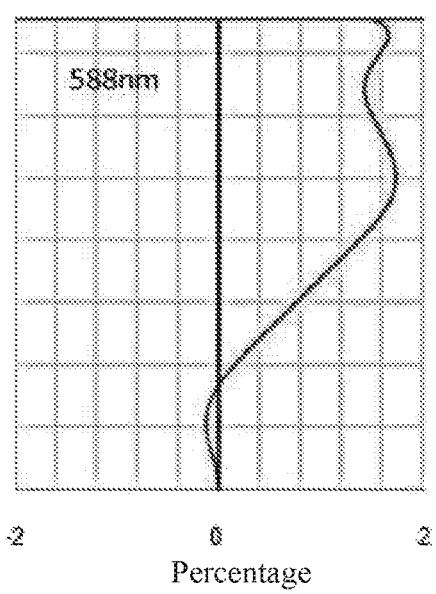

FIG. 6 and FIG. 7 are respectively schematic diagrams of a longitudinal aberration and a lateral color obtained when light having wavelengths of 486 nm, 588 nm and 656 nm passes through the imaging optical lens 20 in the second embodiment. FIG. 8 is a schematic diagram of a field curvature and a distortion obtained when light having a wavelength of 588 nm passes through the imaging optical lens 20 in the second embodiment.

In the imaging optical lens 20 of this embodiment, $2\omega$=72.77°, and Fno=1.732. In this way, the imaging optical lens 20 has a wide angle, high light flux, and excellent optical properties.

Embodiment 3

Figure 9:
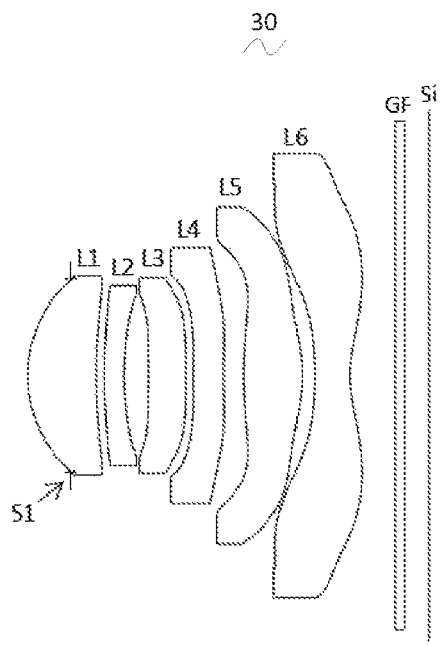
FIG. 9 is a schematic structural diagram of an imaging optical lens according to a third embodiment of the present disclosure.

FIG. 9 is a schematic structural diagram of an imaging optical lens 30 in the third embodiment. The third embodiment is substantially the same as the first embodiment, and symbols in the third embodiment have the same meanings as those in the first embodiment. Only differences between the third embodiment and the first embodiment are listed below.

Table 5 illustrates the curvature radii r of the object-side surface and the image-side surface of the first lens L1 to the sixth lens L6 that constitute the imaging optical lens 30 in the third embodiment, a thickness on-axis d of each lens or a distance on-axis d between lenses, and a refractive index nd and an Abbe number vd of each lens. Table 6 illustrates aspheric data of the lenses in the imaging optical lens 30 in the third embodiment.

It should be noted that, in this embodiment, the curvature radius and the thickness on-axis are measured in millimeters.

TABLE 5

| | r | d | nd | | vd | |
|---|---|---|---|---|---|---|
| S1 | ∞ | d0 = −0.490 | | | | |
| R1 | 1.488 | d1 = 0.790 | nd1 | 1.5209 | v1 | 84.31 |
| R2 | 4.866 | d2 = 0.096 | | | | |
| R3 | 4.238 | d3 = 0.230 | nd2 | 1.6614 | v2 | 20.41 |
| R4 | 3.235 | d4 = 0.282 | | | | |
| R5 | −238.690 | d5 = 0.476 | nd3 | 1.5445 | v3 | 55.99 |
| R6 | −229.329 | d6 = 0.101 | | | | |
| R7 | 19.364 | d7 = 0.319 | nd4 | 1.6150 | v4 | 25.92 |
| R8 | 6.766 | d8 = 0.199 | | | | |
| R9 | 5.076 | d9 = 0.730 | nd5 | 1.5445 | v5 | 55.99 |
| R10 | −1.512 | d10 = 0.139 | | | | |
| R11 | −5.297 | d11 = 0.365 | nd6 | 1.5352 | v6 | 56.09 |
| R12 | 1.235 | d12 = 0.516 | | | | |
| R13 | ∞ | d13 = 0.110 | ndg | 1.5168 | vg | 64.17 |
| R14 | ∞ | d14 = 0.284 | | | | |

TABLE 6

| | Conic coefficient | Aspheric coefficient | | | | | | |
|---|---|---|---|---|---|---|---|---|
| | k | A4 | A6 | A8 | A10 | A12 | A14 | A16 |
| R1 | −0.2609 | −2.5705E−03 | 9.1178E−02 | −2.6472E−01 | 4.6252E−01 | −4.4885E−01 | 2.3049E−01 | −4.8719E−02 |
| R2 | 15.7741 | −4.6970E−02 | −9.8658E−02 | 3.8562E−01 | −6.7442E−01 | 6.2543E−01 | −3.0242E−01 | 5.5351E−02 |
| R3 | 9.6249 | −1.3054E−01 | 6.1546E−02 | 9.9465E−02 | −2.4223E−01 | 2.7334E−01 | −1.6111E−01 | 3.8577E−02 |
| R4 | 9.3643 | −1.2801E−01 | 1.4915E−01 | −4.3785E−01 | 1.1821E+00 | −1.8480E+00 | 1.4793E+00 | −4.7929E−01 |
| R5 | −500.4531 | −1.1930E−01 | 1.4597E−01 | −7.5935E−01 | 1.6613E+00 | −2.0528E+00 | 1.2984E+00 | −3.1846E−01 |
| R6 | 498.8896 | −1.6453E−01 | −1.1501E−01 | 9.5554E−01 | −2.7844E+00 | 3.8207E+00 | −2.5413E+00 | 6.6444E−01 |
| R7 | −102.7092 | −2.3767E−01 | −7.9179E−03 | 7.1741E−01 | −1.7780E+00 | 2.0181E+00 | −1.1043E+00 | 2.2855E−01 |
| R8 | 12.9947 | −2.4858E−01 | 1.6395E−01 | −8.4132E−02 | 2.8348E−02 | 1.1944E−02 | −1.3719E−02 | 3.0265E−03 |
| R9 | −34.6658 | 1.3676E−02 | −8.2584E−02 | 5.1216E−02 | −3.3266E−02 | 1.1530E−02 | −1.7684E−03 | 1.7483E−04 |
| R10 | −9.9795 | 9.9511E−02 | −4.2765E−02 | −6.1594E−03 | 6.3629E−03 | −1.4129E−03 | 1.1683E−04 | −1.9179E−06 |
| R11 | −1.8816 | −1.4924E−01 | 8.7806E−02 | −2.5986E−02 | 6.4947E−03 | −1.3910E−03 | 1.8732E−04 | −1.0801E−05 |
| R12 | −9.9602 | −1.2137E−01 | 6.7385E−02 | −2.8087E−02 | 7.3114E−03 | −1.1409E−03 | 1.0145E−04 | −4.0230E−06 |

Table 7 below exemplarily shows values of f, f1, f2, f3, f4, f5, and f6 in the third embodiment, and f1 and f2, d1 and f, d5 and f, R1 and R2, and R5 and R6 respectively satisfy the relational expressions listed in Table 7.

Figure 10:
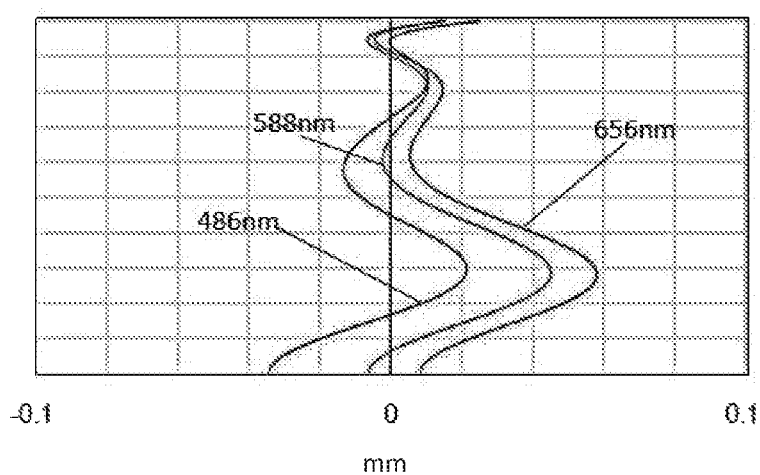
FIG. 10 is a schematic diagram of a longitudinal aberration of the imaging optical lens shown in FIG. 9.
Figure 11:
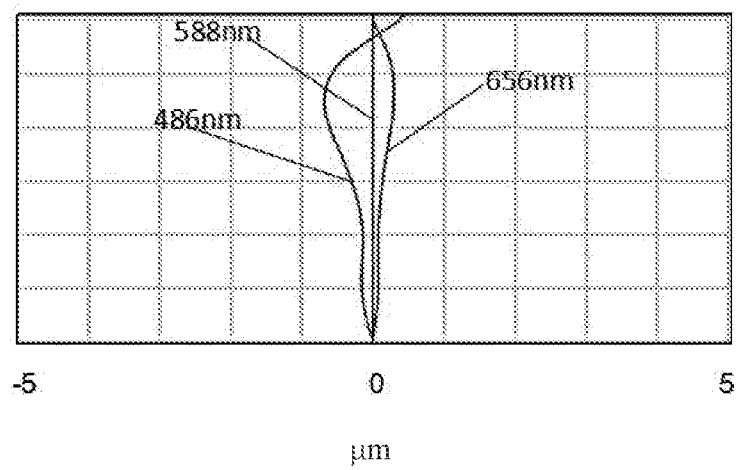
FIG. 11 is a schematic diagram of a lateral color of the imaging optical lens shown in FIG. 9.
Figure 12:
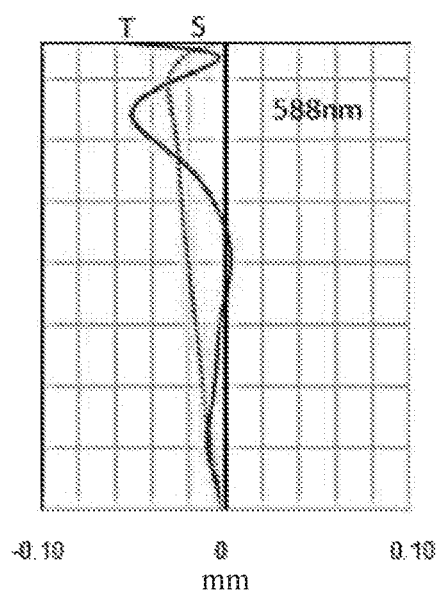
FIG. 12 is a schematic diagram of a field curvature and a distortion of the imaging optical lens shown in FIG. 9.
Figure 12:
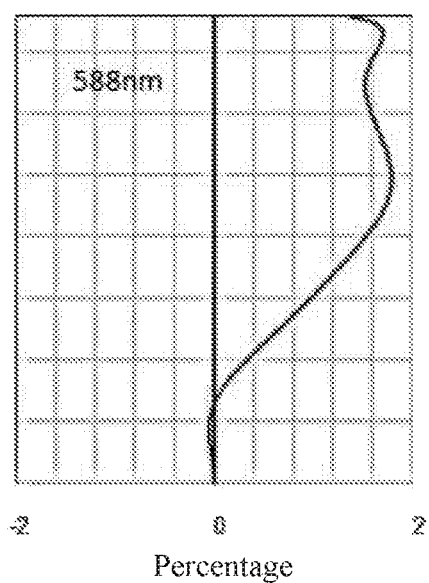

FIG. 10 and FIG. 11 are respectively schematic diagrams of a longitudinal aberration and a lateral color obtained when light having wavelengths of 486 nm, 588 nm and 656 nm passes through the imaging optical lens 30 in the third embodiment. FIG. 12 is a schematic diagram of a field curvature and a distortion obtained when light having a wavelength of 588 nm passes through the imaging optical lens 30 in the third embodiment.

In the imaging optical lens 30 of this embodiment, $2\omega$=73.62°, and Fno=1.75. In this way, the imaging optical lens 30 has a wide angle, high light flux, and excellent optical properties.

Table 7 below illustrates values corresponding to expressions (1), (2), (3), (4), and (5) and values of other related parameters in the first embodiment, the second embodiment, and the third embodiment based on the above expressions. The focal length, the curvature radius, and the thickness on-axis in Table 7 are measured in millimeters.

TABLE 7

|  | Embodiment 1 | Embodiment 2 | Embodiment 3 | Remark |
|---|---|---|---|---|
| $20 \leq (R5 + R6)/(R5 - R6) \leq 100$ | 25.000 | 99.551 | 49.996 | Relational expression (1) |
| $-10 \leq f2/f1 \leq -2.7$ | −4.005 | −9.500 | −5.927 | Relational expression (2) |
| $0.20 \leq d1/f \leq 0.50$ | 0.205 | 0.205 | 0.206 | Relational expression (3) |
| $0.11 \leq d5/f \leq 0.2$ | 0.111 | 0.111 | 0.124 | Relational expression (4) |
| $-1.90 \leq (R1 + R2)/(R1 - R2) \leq -1.7$ | −1.769 | −1.881 | −1.881 | Relational expression (5) |
| Fno | 1.732 | 1.732 | 1.732 |  |
| 2ω | 72.941 | 72.791 | 73.158 |  |
| f | 3.871 | 3.881 | 3.843 |  |
| f1 | 3.662 | 3.895 | 3.798 |  |
| f2 | −14.664 | −36.998 | −22.511 |  |
| f3 | 6429.097 | 1838.811 | 10504.785 |  |
| f4 | −22.174 | −15.806 | −16.922 |  |
| f5 | 2.334 | 2.216 | 2.218 |  |
| f6 | −1.921 | −1.784 | −1.828 |  |

Those of ordinary skill in the art may understand that the foregoing embodiments are specific examples for implementing the present disclosure, and in a practical application, various variations may be made to the form and details without departing from the spirit and scope of the present disclosure.

What is claimed is:

1. An imaging optical lens, comprising from an object side to an image side in sequence: a first lens having a positive refractive power, a second lens having a negative refractive power, a third lens having a positive refractive power, a fourth lens having a negative refractive power, a fifth lens having a positive refractive power, and a sixth lens having a negative refractive power,
    wherein a focal length of the first lens is f1, a focal length of the second lens is f2, a curvature radius of an object-side surface of the third lens is R5, a curvature radius of an image-side surface of the third lens is R6, a thickness on-axis of the first lens is d1, a focal length of the entire imaging optical lens is f, and the following relational expressions are satisfied:

$20 \leq (R5+R6)/(R5-R6) \leq 100$; and $-10 \leq f2/f1 \leq -2.7$;

$0.20 \leq d1/f \leq 0.50$.

2. The imaging optical lens according to claim 1, wherein a thickness on-axis of the third lens is d5, a focal length of the entire imaging optical lens is f, and the following relational expression is satisfied:

$0.11 \leq d5/f \leq 0.2$.

3. The imaging optical lens according to claim 1, wherein a curvature radius of an object-side surface of the first lens is R1, a curvature radius of an image-side surface of the first lens is R2, and the following relational expression is satisfied:

$-1.90 \leq (R1+R2)/(R1-R2) \leq -1.70$.

\* \* \* \* \*